United States Patent
Joussen et al.

(10) Patent No.: US 6,936,643 B1
(45) Date of Patent: Aug. 30, 2005

(54) PLASTIC MOLDED BODY

(75) Inventors: Thomas Joussen, Weinstadt (DE); Daniel Knospe, Schorndorf (DE); Matthias Pähl, Schorndorf (DE); Leonhard Oberascher, Salzburg (AT); Gunter Hieber, Schorndorf (DE)

(73) Assignee: Schock & Co. GmbH, Schorndorf (DE)

( * ) Notice: Subject to any disclaimer, the term of this patent is extended or adjusted under 35 U.S.C. 154(b) by 0 days.

(21) Appl. No.: 09/959,573

(22) PCT Filed: Mar. 16, 2000

(86) PCT No.: PCT/EP00/02333

§ 371 (c)(1),
(2), (4) Date: Nov. 5, 2001

(87) PCT Pub. No.: WO00/67992

PCT Pub. Date: Nov. 16, 2000

(30) Foreign Application Priority Data

May 5, 1999 (DE) .......................... 199 20 719

(51) Int. Cl.$^7$ ................................. C09D 5/29
(52) U.S. Cl. .................. 523/171; 524/423; 524/425; 524/437; 524/442; 524/451; 524/494
(58) Field of Search .................. 523/171; 524/423, 524/425, 437, 442, 451, 494

(56) References Cited

U.S. PATENT DOCUMENTS 3,963,512 A  6/1976  Swift et al.
5,688,839 A  * 11/1997  Royce .................. 523/171
5,756,211 A  *  5/1998  Ittmann et al. ............. 428/409
5,800,910 A     9/1998  Harke et al.

FOREIGN PATENT DOCUMENTS

| DE | 19639039 | 9/1997 |
|----|----------|--------|
| DE | 19749234 | 10/1998 |
| EP | 0786479  | 7/1997 |
| JP | 02212531 | 8/1990 |
| WO | 9716479  | 5/1997 |
| WO | 9813401  | 4/1998 |

* cited by examiner

Primary Examiner—Edward J. Cain
(74) Attorney, Agent, or Firm—Roylance, Abrams, Berdo & Goodman L.L.P.

(57) ABSTRACT

A plastic molded body is produced that resembles natural materials such as marble, granite, etc. more closely that the prior products. The plastic molded body has a polymer phase produced from a hardenable reaction material, and a particulate filler material that is dispersed in the polymer phase. The filler material is a resin material that is filled with an inorganic filler. The polymer phase includes up to 60 wt % inorganic aggregate particles based on the weight of the plastic molded body. The filling material has a grain size of 60 to 8,000 μm and makes up approximately 5 to approximately 65 wt % of the plastic molded body. The filler material has at least 10 volume % of particles that have two or more differently colored, surface-visible polymer layers.

32 Claims, 1 Drawing Sheet

PLASTIC MOLDED BODY

FIELD OF THE INVENTION

The invention relates to a plastic molded body, comprising a polymer phase formed of a polymerizable hardenable reaction material and a particulate filling material dispersed and interposed therein.

BACKGROUND OF THE INVENTION

Plastic molded bodies have for a long time been manufactured for use as cooking or kitchenware platters, kitchen sinks, sanitary fixtures and facilities and the like and used as materials for the manufacture of such articles.

These plastic molded bodies are used in many cases as substitutes for natural materials such as for instance marble, granite, etc., which are characterized by their particularly esthetic visual appearance. In order to as closely as possible resemble this natural appearance, a variety of suggestions have been made. For example, German Patent Nos. 38 32 351, 40 40 602 A1, and 196 39 039 C1 disclose plastic materials that resemble natural stone. The filling material in the plastic materials disclosed in these patents are either inorganic filling materials in the form of granite powder or sand, quartz powder or sand or other minerals of finely to coarsely granulate structure. Particulate filling materials with a polymer base containing inorganic filling materials have been suggested.

Although by using the aforementioned methods molded bodies were obtained which have been highly acceptable commercially, the demand still remains to manufacture materials which still more closely resemble natural materials such as marble, granite and the like.

SUMMARY OF THE INVENTION

An object of the present invention is to provide a plastic molded body that more closely resembles the natural stone materials than the prior molded bodies.

This object is attained by providing a plastic molded body having a polymer phase and a particulate filling material made from a resin material filled with an inorganic filler material. The polymer phase comprises up to 60% by weight inorganic particles as an additive material based on the weight of the plastic molded body. The filling material has a particle size in the range of from 60 to 8,000 micrometers and is included in the polymer phase in an amount of approximately 5 to approximately 75 wt % based on the weight of the plastic molded body. The filling material also comprises at least 10% by volume inorganic filler particles. The filling material is made from two or more differently colored polymers that are visible in the polymer phase.

The use of the particulate filling material, which comprises a resin material filled with an inorganic filling material, and where at least 10% by volume of the particulate filling material particles have two or more differently colored, surface-visible polymer layers, provides a notable improvement in the similarity to the natural materials. The two or more differently colored, surface-visible polymer layers of the particulate filling material more clearly resemble the natural model, since even with natural stones there are certain areas of the stones which are not colored uniformly or with similar intensity.

In one preferred embodiment, the plastic molded bodies include a particulate filling material in which at least one of the two or more differently colored, surface-visible polymer layers is transparent or translucent. This provides increased light-permeability of such particles or particulate layers, and enables light to impinge and penetrate from the surface deeper into the plastic molded body and produces a reinforcement of the color effect on the surface. Similar inclusions and similar visual effects also characterize natural materials, so that this preferred plastic molded body has an appearance that is very close to that of natural materials. In this case, a critical play of color is produced, which leads to the high esthetic value of these materials.

Another similarity to the natural filling materials is produced when the particles of the particulate filling material have a broken granular shape. The inclusions in natural materials very frequently have broken granular shapes, so that this produces a greater similarity to the natural material.

The particulate filling material is based on resin materials that are filled with an inorganic filling material. Preferably the particulate filling material is first manufactured in the form of a plate material having multiple layers. The plate then is broken down, such as by grinding, into filling material particles.

The polymerizable hardenable reaction material that is used for the formation of the polymer phase can be selected from a plurality of known reaction material systems. Preferably, the polymerizable hardenable reaction materials include a first monomer/prepolymer composition that is referred to herein as a syrup. The polymer phase can be an acrylate polymer, polyester or an epoxy resin. The acrylic polymer matrix represents the preferred alternative from the point of view of the price/performance ratio.

The inorganic filling materials being used are used for both the inorganic filler for the particles of the particulate filling material and also as the inorganic particles of the additive material for the polymer phase. The inorganic fillers can be known fillers, such as, granite-, quartz- or other mineral sands or powders. Other inorganic particles as the filling materials include aluminum trihydroxide, chalk, calcium carbonate or carbonate of lime, talcum and barium sulfate and are preferred. The soft fillers with a Mohs' hardness of three to five degrees of hardness are generally preferred. This leads to a simple capacity for processing the plastic molded body which can be executed with a minimal outlay for tooling.

Other filling materials in addition to those mentioned above can generally be selected and used. The hard fillers generally require diamond-fitted tools for processing of the molded bodies and can be processed only at a high cost.

When the first monomer/prepolymer composition and syrup is being used as the polymerizable hardenable reaction material, the prepolymer content in the first syrup is preferably approximately 5 to approximately 30% by weight based on the weight of the syrup. The viscosity of the first syrup is preferably adjusted to approximately 20 to approximately 300 mPa. This viscosity provides ease of processing of the mixture of the syrup and filling material during the manufacture of the plastic molded bodies.

The prepolymer of the first syrup preferably has a median molecular weight of approximately 20,000 to approximately 300,000 Da. This viscosity is most beneficial to provide moderation of the viscosity of the syrup. Simultaneously such prepolymers provide a reduced shrinkage during hardening. The acrylate polymers are particularly beneficial in reducing shrinkage.

Furthermore, the first syrup preferably comprises a radical polymerizable monomer. The acrylate type, and particularly acrylate and methacrylate monomers, are suitable. The associated prepolymer is used preferably as homo- or co-polymer of the monomers.

In one particularly preferred embodiment of the invention, the particulate filling material is selected such that it can expand in the polymerizable hardenable reaction material. The filled resin material, at least in its filler-particle-containing layers which are not transparent or translucent, have a particulate filling material range of 50 to 80% by weight with a particulate granular size of from approximately 5 to approximately 100 micrometers.

If the particulate filling material in the polymerizable hardenable reaction composition is allowed to expand, the composition is no longer flowable. The composition can be pressed into molds where the particulate filling material is pressed so that a portion of multiple-layered filling material particles are on the visible surface where it can be viewed. Thus a sufficient portion of multiple layer filling material particles is guaranteed to be visible on the surface of the mold body and thus can provide the effect of the simulation of natural materials.

If smaller portions of the filler components are used, for example 5 to 20% by weight of the particulate filling materials and approximately 40 to approximately 60% by weight inorganic particles of the additive materials, a flowable and pumpable dispersion of the filling materials and additive materials in the polymerizable reaction materials is obtained. When this composition is molded, an insufficient number of the multiple layers of a particular filling material may be visible on the surface. Here then it is recommended that a sanding of the surface or at least an abrasive processing of the surface be executed, in order to leave a sufficient quantity of the multiple layer filling material particles visible on the viewed surface of the plastic molded body.

The resin material of the particulate filling materials is preferably manufactured from a second monomer/prepolymner syrup, which contains a portion of approximately 5 to approximately 30% by weight prepolymer with a median molecular weight in the range of approximately 20,000 to approximately 300,000 Da.

The inorganic filler material for this resin material is preferably aluminum oxide trihydrate. Alternatives to granite-, quartz- and other fillers can be used, if necessary in mixture with aluminum oxide trihydrate (ATH).

The aluminum oxide trihydrate is preferably coated with a silane in a quantity of 0.04 to 1% by weight in relation to the weight of the aluminum oxide trihydrate. This provides for a guaranteed coupling of the filling material particles to the surrounding phase of resin material. Furthermore, the preferred second monomer/prepolymer syrups include a cross-linking agent in an amount of approximately 0.5 to 5% by weight in relation to the entire weight of the syrup. The portion of cross-linking agent allows for sufficient moisture content of the filling material particles to be expected, whereby on the other hand the cross-linking is not carried so far that too limited a moisture-expansibility is obtained. Primarily bi- or poly-functional acrylate cross-linking agents are used as cross-linking agents in the second monomer/prepolymner syrup.

The particulate filling material is preferably composed of a mixture of different granular filling materials. This arrangement can still provide various different effects and a greater similarity to the natural materials.

The invention furthermore relates to a method for the manufacture of plastic molded bodies as described above, whereby a mixture of a polymerizable hardenable reaction material manufactured for the formation of a polymer phase with a particulate filling material is placed in a mold for hardening. The polymerizable hardenable reaction material comprises up to 60% by weight of inorganic particles or filling materials. A particulate filling material which can expand in the reaction material can be used as filling material. The particulate filling material comprises a resin material filled with an inorganic filler material. The particulate filling material has a particle size or granular dimensions from 60 to approximately 8,000 micrometers. At least 10% by volume of the particulate filling material is formed of particles which have two or more different colored, surface-visible polymer layers. The particulate filling material is included in an amount of approximately 5 to approximately 75% by weight. The resulting molding composition is placed in a mold for hardening and there is thermally hardened. In one embodiment the total amount of the inorganic filler of the particulate filling material and the inorganic particles of the molded plastic body is about 30 wt % to about 65 wt % based on the total weight of the molded plastic body.

As explained above, with the described method of manufacture, after molding, a sliver- or shaving-removal or abrading step can be performed either alone or in combination.

These and other advantages of the invention are to be explained in greater detail hereinafter relative to the drawing and the examples.

DETAILED DESCRIPTION OF THE INVENTION

Figure 1:
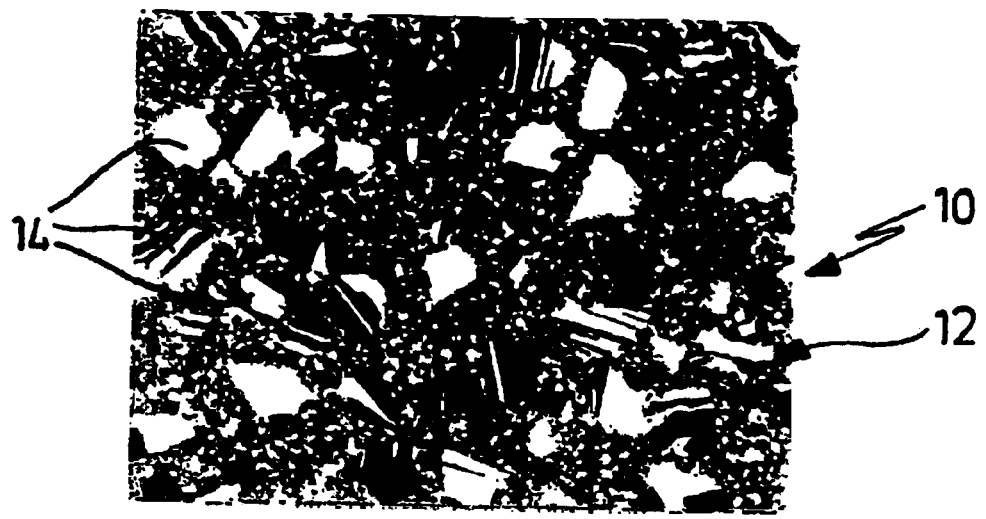
FIG. 1: is a side view of a plastic molded body according to the invention.

The plastic molded body 10 of FIG. 1 exhibits a continuous polymer phase 12 formed of a polymerizable hardenable reaction material, which interposed therein incorporates a contrasting colored, particulate filling material 14. The individual particles of filling material 14 have a broken granular form and therefore provide two or more differently colored, surface-visible polymer layers. By these contrasting color effects, a very good similarity to natural materials, and particularly natural stones such as granite, is obtained.

Figure 2:
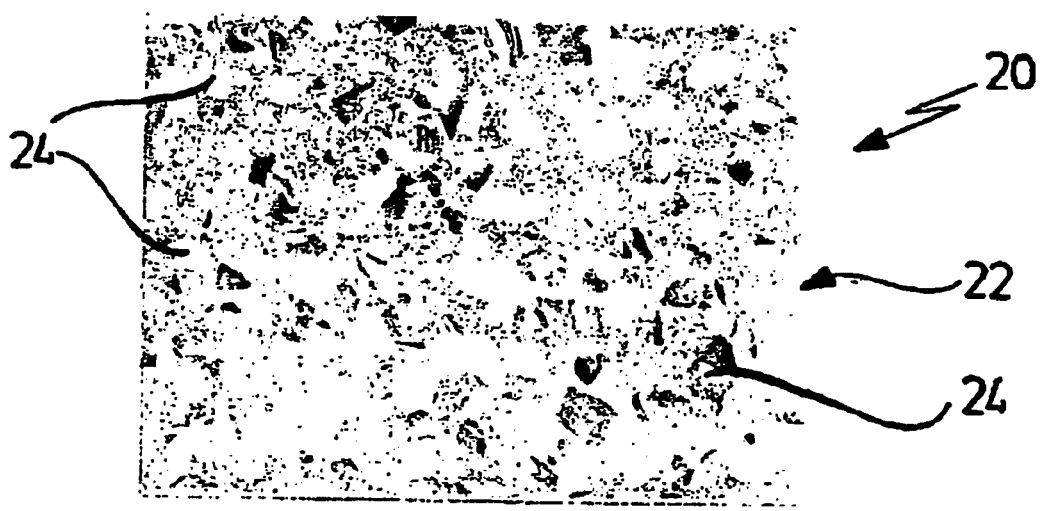
FIG. 2: is a side view of a different plastic molded body according to the invention.

FIG. 2 shows a side view of a molded body 20 of the invention, in which likewise a polymer phase 22 passing over the entire area includes colored contrasting particulate filling material particles 24. As in FIG. 1, at least some of the colored contrasting filling material particles are composed of two or more differently colored, surface-visible polymer layers. In this embodiment, a portion of the polymer layers of the particulate filling material particle is transparent. This material thus obtains a visual depth and a still stronger effect of similarity to natural materials.

However in the present invention the type of layers of granulate particles are preferred as the particulate filling material where one of the colored layers, in other words filling material- and pigment-containing components or polymer layer and a transparent polymer layer, can be interchanged with one another. Hereinafter, relative to the examples, the production of such layered granulate particles is to be described.

EXAMPLE 1

Generally speaking, here are two differently colored casting resins, either with or without a particulate filling material, are manufactured from and including the required components, are cast through thin nozzles by means of an oscillating movement into a sort of flat cake pan. In doing this, care is taken that as many phase interfaces as possible are present between these two cast resin strands. The viscosity of the two cast resins is designed so that mixing is essentially avoided. Suitable viscosities are found for example in the range of from 6,000 to 40,000 mPas, preferably at approximately 10,000 mPas. Following filling of the 'flat cake pan' member, the material is hardened in a press.

Following the grinding of the hardened material, a granulate is produced having particle dimensions of between 60 and 8,000 micrometers. The granulate shows on its surface a coating of for example transparent and colored material. These particles are now suitable for use as the particulate filling material of the present invention for the production of plastic molded articles, for example plates or other molded articles, such as for example kitchen sinks, sanitary facilities or the like. Instead of only one granulate type, different granulate types can be used with differently colored layer components. In this case materials are present which fulfill an extraordinarily high visual appearance requirement.

The special effects of the granules in the layers in the plastic molded bodies according to the invention are described as follows:

Particularly as a result of the transparent portion of a granulate layer, a play of color can be attained which is similar to a light conductor where the color impression is reinforced by the background colors. In accordance with the degree of removal of the layer of granulate particles from the surface, in other words how far they are beneath the surface, either immersed far under the surface or found directly adjacent to the surface, various different visual effects can be obtained. In accordance with the density of particles within the layer of the coating, whether the coating is oriented to be perpendicular, oblique, or parallel to the surface of the mold body, other particular visual effects are obtained in turn, which provides an additional enrichment of the overall visual effect.

As a result of these described effects a completely novel visual effect is produced by use of the plastic molded bodies, that are not only similar in appearance to the natural materials, but can also offer a completely new and independent visual appearance.

Above all with large particles, in other words particles >1,500 micrometers, a complex visual effect is produced and not the layer structure of an otherwise traditional, sensational effect. In accordance with the colors that are included in the second component, various different visual variations can be obtained in connection with the transparent components and the background colors.

In the following description all of the data are disclosed in terms of percentage by weights, insofar as not expressly stated otherwise.

Casting Resins for the Production of the Granulate Layer

Component A is used for a transparent or translucent polymer layer with an average percentage portion of the entire material of 20 to 80% of granulate layer, particularly preferably approximately 40%, whereby the total material has a viscosity of 6 to 40 Pa·s.

| Formula for Component A: | | |
|---|---|---|
| Syrup | | 80–97% |
| | MMA | 60–85% |
| | PMMA 70,000–200,000 Da | 15–40% |
| Filling material | pref: silicate layer Silicic acids, ATH | 0–20% |
| Cross-linking agent/TRIM | | 0.5–4% |
| Peroxide 1 (BCHPC) | | 0.2–1%– |
| Peroxide 2 (LP) | | 0.4–2% |
| Stearic acid | | 0–0.2% |

MMA - methyl methacrylate
PMMA
TRIM
BCHPC
LP

One specific formula example for component A is composed of 93.4% syrup (70% MMA, 30% PMMA (100,000 Da)), 3% pyrogenous silicic acid (aerosil R 812 S), 2% TRIM as cross-linking agent, 0.1% stearic acid as mold separation medium. The viscosity of a formulated material composed in this manner is approximately 10 Pa·s.

Components B1, B2 . . . Bn are used for polymer layers colored in different colors (1, 2, . . . n), used with a total average percentage component portion of the components in the entire batch of material of the granule layer of 20 to 80%, preferably approximately 60%, when the component A (transparent or translucent) is being used as the other polymer layer component. With this combination, a viscosity of the entire batch of material of 6 to 40 Pa·s is obtained.

Formula of the components Ba, B2 . . . Bn

| Formula of the components Ba, B2 . . . Bn | | |
|---|---|---|
| Syrup | | 25–70% |
| | MMA | 70–85% |
| | PMMA 70,000–200,000 Da | 15–30% |
| Filling material | pref ATH | 20–75% |
| Cross-linking agent/TRIM | | 0.5–4% |
| Peroxide 1 (BCHPC) | | 0.2–1% |
| Peroxide 2 (LP) | | 0.4–2% |
| Stearic acid | | 0.05–0.2% |
| Pigments | in colors 1, 2, . . . or n | 0.01–4 parts by weight per 100 weight/parts, total formula |

One specific formula example for component B is composed of 33.4% syrup (80% MMA, 20% PMMA (100,000 Da)), 63% filling material ATH (grain dimensions: d50=35 micrometers, 2% TRIM as cross-linking agent, 0.5% pyrogenous silicic acid (aerosil R 812 S), 0.5% BCHPC as first peroxide, 1% LP as second peroxide and 0.1% stearic acid as mold separation medium. The viscosity of a material of such a formula is approximately 10 Pa·s. Pigments are added to the formula material batch according to any desired selection, dependent upon the desired color effect.

By combining components A and B1, B2, . . . and/or Bn, transparent, covering, colored granulate layers are obtained. By combination of B1 and B2, . . . Bn, granulate layers having light-dark, black-white, or motley clay contrasts are obtained.

Method for the Production of the Granulate Layer

Both of the casting materials are filled into a mold through fine multiple nozzles (approximately 1 to 3 mm diameter). The diameter of the nozzles establishes the number of phase interfaces and/or the thickness of the layers in the granulate layer.

The material is hardened in a press under pressure and temperature as follows:

| | |
|---|---|
| Layer thickness | 5–15 mm, e.g. 8 mm |
| Hardening temperature | 80–130° C., e.g. 100° C. |
| Hardening pressure | 1–8 bar, e.g. 6 bar |
| Hardening cycle | 15–40 min., e.g. 25 min |

Following cooling, the plates of material are ground and screened or sifted in several granulate layer fractions.

| | |
|---|---|
| Fine | 80–600 micrometers |
| Medium | 600–1,200 micrometers |
| Coarse | 1,200–2,500 micrometers |
| Very coarse | >2,500 micrometers |

In the case of the granulate layer obtained in this manner the component portion of particles, including two or more differently colored, surface-visible polymer layers, is always far above the bottom limit required for the visual effects according to the invention, a limit of 10% by volume.

Production of Plastic Molded Bodies with Either Fanciful or Granite Structures with use of Granulate Layers a) Use of the Traditional Dispersion or Casting Technology For this purpose, a pumpable or castable hardenable reaction material is produced of acrylic resin, acrylate monomer and ATH (see also for instance DE 40 40 602 A1), and into this material is mixed the particulate filling material, the granulate layer. The viscosity of the cast material is preferably in the range of 5 to 80 Pa·s.

| Formula for traditional casting material technology | | |
|---|---|---|
| Syrup | | 25–50% |
| | MMA | 70–90% |
| | PMMA 70,000–200,000 Da | 15–30% |
| Filling material | pref. ATH | 20–75% |
| Polymer granulate (desired mixture of gran. layer fractions) | A, B1, B2, . . . Bn | 5–30% |
| | desired color combinations possible | |
| Cross-linking agent/TRIM | | 0.5–4% |
| Peroxide 1 (BCHPC) | | 0.2–1% |
| Peroxide 2 (LP) | | 0.4–2% |
| Stearic acid | | 0.05–0.2% |
| Solid material content of the material (total molded body) | | 45–60% |

One specific formula example is composed of 37% syrup (80% MMA, 20% PMMA (100,000 Da)), 39.4% filling material ATH (grain dimensions: d50=35 micrometers), 20% granulate layer, 2% TRIM as cross-linking agent, 0.5% BCHPC as first peroxide, 1% LP as second peroxide and 0.1% stearic acid as mold separation medium. The viscosity of a formula material composed in this manner is approximately 30 Pa·s. The total solid material content in the plastic molded body is preferably approximately 50%.

| Hardening conditions | |
|---|---|
| Hardening temperature | 80–130° C., e.g. 100° C. |
| Hardening pressure | 1–8 bar, e.g. 6 bar |
| Hardening cycle | 15–40 min., e.g. 30 min | b) Use of the BMC Technology

For this purpose, a casting material with a high component portion of polymer granulate is produced. At the beginning this portion is still liquid, but its consistency is modified as a result of a moisture-expanding process. After one hour the mixture batch is no longer a castable material, having a viscosity of 100 to 1,000 Pa·s, which is fed into the mold and is pressed therein under high pressure.

| Formula for BMC technology | | |
|---|---|---|
| Syrup | | 25–50% |
| | MMA | 70–90% |
| | PMMA 70,000–200,000 Da | 15–30% |
| Filling material | pref. ATH | 0–10% |
| Polymer granulate (desired batching of the granulate layer fraction) | A, B1, B2, . . . Bn | 20–75% |
| | desired color combination possible | |
| Cross-linking agent/TRIM | | 0.5–4% |
| Peroxide 1 (BCHPC) | | 0.2–1% |
| Peroxide 2 (LP | | 0.4–2% |
| Stark acid | | 0.05–0.2% |
| Solid material content of the material (total molded body) | | 35–55% |

One specific formula example is composed of 38% syrup (80% MMA, 20% PMMA (100,000 Da)), 6% filling material ATH (grain dimensions: d50=35 micrometers), 52,4% granulate layer, 2% TRIM as cross-linking agent, 0.5% BCHPC as first peroxide, 1% LP as second peroxide and 0.1% stearic acid as mold separation medium. The viscosity of a material of formula composed in this manner is approximately 500 Pa·s. The preferred solid material content of the entire molded body is approximately 45%.

| Hardening conditions | |
|---|---|
| Hardening temperature | 80–130° C., e.g. 100° C. |
| Hardening pressure | 1–8 bar, e.g. 6 bar |
| Hardening cycle | 15–40 min., e.g. 30 min |

EXAMPLE 2

Production of the White/Transparent Granulate Layer

Component A (transparent):

200 g BCHPC and 300 g LP are dissolved in 45,900 g of an acrylic syrup (solid material content 30% PMMA homopolymer; molecular weight 100,000 Da), and subsequently another 1,900 g TRIM is mixed in. Then 1,600 g of aerosil R 812 S are added. The mixing is carried out for 15 minutes with a dissolving agent and then the batch mixture is evacuated for another 15 minutes with stirring.

Component B1 (white):

77 g of BCHPC and 117.6 g of LP and 49.0 g of stearic acid are dissolved in 17,093 g of an acrylic syrup (solid material content 15% PMMA homopolymer). Then another 49,000 g aluminum hydroxide (d50=35 micrometers) are dispersed and 78.4 g aerosil R 812 S are mixed in as anti-settling agent. The coloring of the mixture batch occurs with 2,800 g of a preliminary dispersed paste (acrylic syrup TiO$_2$=1:1) of titanium dioxide (RF K 2 of Bayer). Then the batch is stirred for 10 minutes and is evacuated with stirring for another 10 minutes.

EXAMPLE 3

Production of the Black/White Granulate Layer

Component B1 (white):

77 g BCHPC and 117.6 g LP and 49.0 g stearic acid are dissolved in 17,093 g of an acrylic syrup (solid material content 15% PMMA homopolymer). Then another 49,000 g aluminum hydroxide (d50=35 micrometers) are dispersed and 78.4 g aerosil R 812 S are mixed in as anti-settling agent. The coloring and mixing occurs with 1,600 g of a preliminary dispersed paste (acrylic syrup:TiO$_2$=1:1) of titanium dioxide (RF K 2 of Bayer). Then the batch is stirred for 10 minutes and is evacuated with stirring for another 10 minutes.

Component B2 (black):

77 g BCHPC and 117.6 g LP and 49.0 g stearic acid are dissolved in 17,093 g of an acrylic syrup (solid material content 15% PMMA homopolymer). Then another 49,000 g aluminum hydroxide (d50=35 micrometers) is dispersed and 78.4 g aerosil R 812 S is mixed in as anti-settling agent. The coloring of the mixture batch occurs with 1,400 g of a preliminary dispersed paste (acrylic syrup:iron oxide back= 1:1; iron oxide black M 318 of Bayer). Then the batch is stirred for 10 minutes and is evacuated with stirring for another 10 minutes.

EXAMPLE 4

Production of the Orange/Green Granulate Layer

Component B3 (orange):

77 g BCHPC and 117.6 g LP and 49.0 g stearic acid are dissolved in 17,093 g of an acrylic syrup (solid material content 15% PMMA homopolymer). Then another 45,000 g aluminum hydroxide (d50=35 micrometers) are dispersed and 78.4 g aerosil R 812 S are mixed in as anti-settling agent. The coloring of the mixture occurs with 500 g of a preliminary dispersed paste (acrylic syrup:orange=1.6) of chromophthalium (orange GP, Ciba-Geigy). Then the batch is stirred for 10 minutes and evacuated with stirring for another 10 minutes.

Component B4 (green):

77 g BCHPC and 117.6 g LP and 49.0 g stearic acid are dissolved in 17,093 g of an acrylic syrup (solid material content 15% PMMA homopolymer). Then another 43,000 g aluminum hydroxide (d50=35 micrometers) are dispersed and 78.4 g aerosil R 812 S are mixed in as anti-settling agent. The coloring of the mixture occurs with 800 g of a preliminarily dispersed paste (acrylic syrup:green=1:3) of chromophthalium (green GFNP, Ciba-Geigy). Then the batch is stirred for 10 minutes and is evacuated with stirring for another 10 minutes.

EXAMPLE 5

| Processing of the granulate layer with the BMC technology | | |
|---|---|---|
| Natural master batch | 18,426 g | acrylic syrup (21% PMMA homopolymer) |
| | 6,142 g | MMA |
| | 716.8 g | TRIM |
| | 71.7 g | Stearic acid |
| | 89.6 g | BCHPC |
| | 153.6 g | LP |

59 g of a white paste (acrylic syrup:TiO$_2$=1:1) and 5,700 g aluminum hydroxide (silanized) are added into 30,340 g natural master batch. As filling material particles the following are added into the granite reproduction:

| White polymer granulate | 0.08–0.6 mm | 14,870 g |
|---|---|---|
| White polymer granulate | 0.6–1.2 mm | 7,929 g |
| Blue polymer granulate | 0.08–0.6 mm | 152 g |
| Granulate layer (Ex. 2) | 0.08–0.6 mm | 2,764 g |
| Granulate layer (Ex. 2) | 0.6–1.2 mm | 7,274 g |
| Granulate layer (Ex. 2) | 1.2–2.5 mm | 6,909 g |

The white and/or blue in the present example and also the following interpolated polymer granulate is analogous to the formulas of the individual color components B1, B2, . . . with corresponding color adjustments, as provided in the tables, manufactured, ground and screened or sifted in fractions.

The material batch is mixed for 10 minutes and decontaminated and degassed for 10 minutes. Then, after the material has expanded and without further sedimentation problems, it is pressed in a press and can be hardened. The surface obtained hereby is similar to that shown in FIG. 2. In that drawing, for improved representation of the reproduction, the reaction material (polymer phase 22) has been colored with a small portion (0.05%) of a black pigment (black iron oxide M 318, Bayer). The granulate layer being used is the granulate layer from Example 3 and the black pigment portion is increased to approximately 0.4%, and a surface as shown in FIG. 1 is obtained.

Comparison Example 1

Without Granulate Layer/Without Transparent Component Portions 59 g of a white paste (acrylic syrup:TiO$_2$=1:1) and 5,700 g aluminum hydroxide (silanized) are fed into 30,340 g of natural master batch. The following are joined thereto as granite particles:

| White polymer granulate | 0.08–0.6 mm | 17,634 g |
|---|---|---|
| White polymer granulate | 0.6–1.2 mm | 15,203 g |
| Blue polymer granulate | 0.08–0.6 mm | 152 g |
| White polymer granulate | 1.2–2.5 mm | 6,909 g |

The material batch is mixed for 10 minutes and is decontaminated and degassed for 10 minutes. Then after the material has expanded and has been pressed into a press, without further sedimentation problems it can be hardened.

The material with the granulate layer from Example 5 is characterized as compared with the results of the comparison Example 1 by a notably improved visual appearance. In order to emphasize the visual properties still more clearly, in other words in order to be able to 'set free' the granulate layer grains in a more attractive manner, approximately 100 to 500 micrometers of material can be ground and polished.

EXAMPLE 6

Processing of the granulate layer with the traditional dispersion technology

| Natural Master Batch | 18,426 g | acrylic syrup (21%, PMMA Homopolymer |
| --- | --- | --- |
| | 6,142 g | MMA |
| | 716.8 g | TRIM |
| | 71.7 g | stearic acid |
| | 89.6 g | BCHPC |
| | 153.6 g | LP |
| | 18,402 g | aluminum hydroxide (ATH) (grain dimensions: d50 = 35 micrometers |

The following are placed in 25,000 g of natural master batch: the following are added to the granite reproduction as filler material:

| White polymer granulate | 0.08–0.6 mm | 2,870 g |
| --- | --- | --- |
| White polymer granulate | 0.6–1.2 mm | 500 g |
| Blue polymer granulate | 0.08–0.6 mm | 106 g |
| Granulate layer (Ex. 2) | 0.08–0.6 mm | 764 g |
| Granulate layer (Ex. 2) | 0.6–1.2 mm | 2,274 g |
| Granulate layer (Ex. 2) | 1.2–2.5 mm | 1,909 g |
| Total | | 8,423 g |

The material batch is mixed for 10 minutes and is decontaminated and degassed for 10 minutes. Then it is left to rest until the material has expanded. Then the material is pumped into casting molds and is hardened under pressure and temperature. The surface obtained in this manner is again similar to the surface obtained in Example 5.

Comparison Example 2

As filling material the following are added into 25,000 g natural master batch for granite reproduction:

| White polymer granulate | 0.08–0.6 mm | 3,634 g |
| --- | --- | --- |
| Blue polymer granulate | 0.08–0.6 mm | 106 g |
| White polymer granulate | 0.6–1.2 mm | 2,774 g |
| White polymer granulate | 1.2–2.5 mm | 1,909 g |
| Total | | 8,423 g |

The material batch is mixed for 10 minutes and is decontaminated and degassed for 10 minutes. Then it is left to rest until the material has expanded. Then the material is pumped into casting molds and is hardened under temperature and pressure.

The material with the granulate layer according to Example 6 is characterized by a clearly improved visual appearance as compared with the results of Comparison Example 2. When the visual appearance properties are to be emphasized still more clearly, in other words in order to 'free' the granulate grains, approximately 100 to 500 micrometers of material can be ground and polished.

While various embodiments have been chosen to illustrate the invention, it will be understood by those skilled in the art that various changes and modifications can be made therein without departing from the scope of the invention as defined in the appended claims.

What is claimed is:

1. A molded plastic body, comprising:
   a polymer phase formed from a polymerizable and hardenable reaction material;
   about 5 wt % to about 75 wt % of a particulate filling material based on the total weight of said molded plastic body, said particulate filling material having a particle size of 60 to 8,000 micrometers and being formed from at least two different colored polymer particles including an inorganic filler, at least 10% by volume of said colored polymer particles being of a different color than the remaining colored particles, and said at least two different colored particles being visible in said polymer phase, at least one of said at least two different colored polymer particles having a first colored polymer layer and a second colored polymer layer, said second polymer layer having a color that is different from the color of said first polymer layer; and
   inorganic particles, where said polymer phase contains up to about 60 wt % of said inorganic particles based on the total weight of said plastic body, said inorganic particles being dispersed in said polymer phase.

2. The molded plastic body of claim 1, wherein at least one of said different colored polymer particles is transparent or translucent.

3. The molded plastic body of claim 1, wherein said at least two different colored polymer particles have a broken grain configuration.

4. The molded plastic body of claim 1, wherein said hardenable reaction material comprises a monomer-prepolymer composition.

5. The molded plastic body of claim 4, wherein said monomer-prepolymer composition includes about 5 wt % to about 30 wt % of said prepolymer based on the weight of said monomer-prepolymer composition.

6. The molded plastic body of claim 5, wherein said monomer-prepolymer composition has a viscosity of about 20 mPas to about 300 mPas.

7. The molded plastic body of claim 6, wherein said prepolymer has an average molecular weight of about 20,000 Da to about 300,000 Da.

8. The molded plastic body of claim 4, wherein said monomer is a radical polymerizable monomer component; and wherein said prepolymer is a homopolymer or copolymer of said radical polymerizable monomer component.

9. The molded plastic body of claim 4, wherein said monomer is an acrylate.

10. The molded plastic body of claim 4, wherein said monomer is methylmethacrylate and said prepolymer is polymethylmethacrylate.

11. The molded plastic body of claim 1, wherein said particulate filling material is expandable; wherein said at least two different colored particles include 10 wt % to 70 wt % of said inorganic filler; and wherein said inorganic filler has a particle size of about 5 to about 1000 micrometers.

12. The molded plastic body of claim 1, wherein said at least two different colored polymer particles of said particulate filling material are produced from a monomer-prepolymer composition, said monomer-prepolymer composition including about 5 wt % to about 30 wt % of said prepolymer; and wherein said prepolymer has an average molecular weight of about 20,000 Da to about 300,000 Da.

13. The molded plastic body of claim 1, wherein said inorganic filler of said particulate filling material is aluminum oxide trihydrate having about 0.04 wt % to about 1 wt % of a silane coating material, where the amount of said silane coating material is based on the weight of said aluminum oxide trihydrate.

14. The molded plastic body of claim 1, wherein said polymer particles are formed from a monomer-prepolymer composition including about 0.5 wt % to about 5 wt % of a crosslinking agent based on the weight of said monomer-prepolymer composition.

15. The molded plastic body of claim 14, wherein said crosslinking agent is a bi-functional or tri-functional acrylate crosslinking agent.

16. The molded plastic body of claim 1, wherein said particulate filling material is a mixture of different polymer particles.

17. The molded plastic body of claim 1, wherein the total amount of said inorganic filler of said particulate filling material and said inorganic particles is about 30 wt % to about 65 wt % based on the weight of said molded plastic body.

18. The molded plastic body of claim 1, wherein said molded plastic body has a surface area that is treated to remove slivers of said particulate filing material.

19. The molded plastic body of claim 18, wherein said surface area of said molded plastic body is sanded to produce a smooth surface.

20. The molded plastic body of claim 1, wherein said inorganic particles are selected from the group consisting of graphite, quartz, aluminum oxide trihydrate, chalk, calcium carbonate, talcum and barium sulfate.

21. A molded plastic body, comprising:

a continuous polymer phase;

about 5 wt % to about 75 wt % of a particulate filling material based on the total weight of said molded plastic body, said particulate filling material having first polymer particles of a first color and second polymer particles of a second color, said first and second polymer particles having a particle size of 60 to 8,000 micrometers and including an inorganic filler, said particulate filing material including at least 10% by volume of said first polymer particles of said first color, said first and second polymer particles being visible in said polymer phase and at least one of said first and second polymer particles being formed from different colored polymer layers; and inorganic particles, where said polymer phase contains up to about 60 wt % of said inorganic particles based on the weight of said plastic body, said inorganic particles being dispersed in said continuous polymeric phase.

22. The molded plastic body of claim 21, wherein said continuous polymer phase is transparent or translucent.

23. The molded plastic body of claim 21, wherein said first and second polymer particles have a broken angular shape.

24. The molded plastic body of claim 21, wherein said continuous polymer phase is selected from the group consisting of polyacrylates, polyesters and epoxy resins.

25. The molded plastic body of claim 21, wherein said inorganic filler and said inorganic particles are independently selected from the group consisting of granite, quartz, aluminum oxide trihydrate, chalk, calcium carbonate, talcum and barium sulfate.

26. A method for producing a molded plastic body comprising the steps of:

preparing a polymerizable reaction mixture containing inorganic particles and about 5 wt % to about 75 wt % of particulate filling materials having a particle size of 60 to 8,000 micrometers and being formed from at least two different colored polymer particles, said at least two different colored polymer particles including an inorganic filler, at least one of said two different colored polymer particles being formed from different colored polymer layers, at least 10% by volume of said colored polymer particles being of a color different from the color of the remaining colored polymer particles, and said inorganic particles being included in an amount of up to 60 wt %;

introducing said polymerizable reaction mixture into a mold; and heating said polymerizable reaction mixture to cure and harden said mixture to produce said molded plastic body.

27. The method of claim 26, further comprising treating at least one surface area of said molded plastic body to remove slivers of said particulate filling material and produce a smooth surface.

28. The method of claim 26, further comprising abrading at least one surface of said molded plastic body to produce a smooth surface.

29. A molded plastic body, comprising:

a polymer phase formed from a polymerizable and hardenable reaction material;

about 5 wt % to about 75 wt % of a particulate filling material based on the total weight of said molded plastic body, said particulate filling material having a particle size of 60 to 8,000 micrometers and being formed from at least two different colored polymer particles including an inorganic filler having a silane coating, at least 10% by volume of said colored polymer particles being of a different color than the remaining colored particles, and said at least two different colored particles being visible in said polymer phase; and inorganic particles, where said polymer phase contains up to about 60 wt % of said inorganic particles based on the total weight of said plastic body, said inorganic particles being dispersed in said polymer phase.

30. The molded plastic body of claim 29, wherein said inorganic filler of said polymer particles is aluminum oxide trihydrate.

31. The molded plastic body of claim 29, wherein said inorganic particles include said silane coating in an amount of about 0.04 wt % to about 1 wt % based on the weight of the inorganic particles.

32. The molded plastic body of claim 30, wherein said aluminum oxide trihydrate includes said silane coating in an amount of about 0.04 wt % to about 1 wt %.

* * * * *